No. 865,095. PATENTED SEPT. 3, 1907.
G. L. FORREST.
MEAT CHOPPER.
APPLICATION FILED JUNE 26, 1906.

Witnesses:
Chas. E. Gorton.
Arthur C. Lotz

Inventor:
George L. Forrest
By Rudolph M. Lotz, Atty.

UNITED STATES PATENT OFFICE.

GEORGE L. FORREST, OF CHICAGO, ILLINOIS.

MEAT-CHOPPER.

No. 865,095.  Specification of Letters Patent.  Patented Sept. 3, 1907.

Application filed June 26, 1906. Serial No. 323,518.

*To all whom it may concern:*

Be it known that I, GEORGE L. FORREST, a citizen of the United States, residing at Chicago, in the county of Cook and State of Illinois, have invented certain new and useful Improvements in Meat-Choppers; and I do hereby declare the following to be a full, clear, and exact description of the invention, such as will enable others skilled in the art to which it appertains to make and use the same.
My invention has for its object to provide an attachment for meat choppers which is easily mounted thereon and by means of which the coarsely chopped meat is passed through a second chamber from which it is delivered in a very finely divided state, thus obviating the necessity of passing the same twice through the machine, and consists in the features of construction and combinations of parts hereinafter fully described and claimed.

Figure 1:
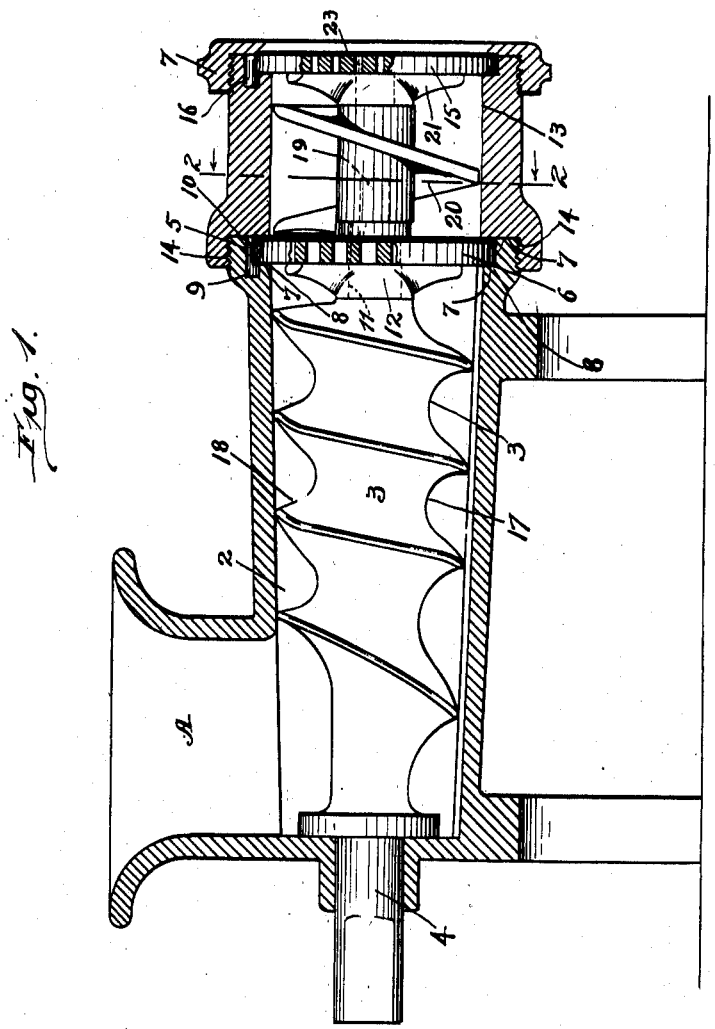
Figure 2:
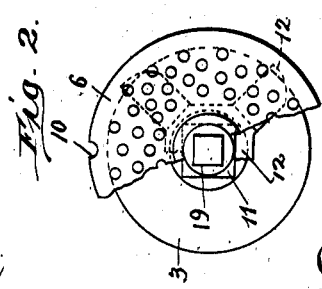

In the accompanying drawings illustrating my invention: Figure 1 is a central vertical longitudinal section of a meat chopper provided with an attachment constructed in accordance with my invention. Fig. 2 is a detail transverse section on the line 2—2 of Fig. 1, the worm in the second chamber being removed.
My invention has for its primary object to provide means whereby a machine of the standard size now generally employed may be converted into what I term a double acting machine constructed in accordance with my invention without necessitating the removal of such machine to a shop, and consists further in the details of construction of the attachment and the means for mounting the same on a machine all as hereinafter fully described.

In the accompanying drawings, A indicates a meat chopper of the kind generally employed, the latter being provided with a feed hopper from which the meat to be chopped passes into a tapered conical chamber 2 in which a spiral screw conveyer 3 is revolubly disposed. The latter comprises a casting terminating at one end in a trunnion 4, the end of which is polygonal in order to receive a crank or other means whereby said screw 3 is revolved. The meat is fed into the smaller end of said chamber 2 and is forced by said screw 3 toward the larger or delivery end thereof. In the mouth of the latter which is annularly enlarged as at 5 a perforated steel plate 6 is disposed through which the meat is forced by the action of said screw 3. The said plate 6 is normally held in position by means of a flanged end 7 internally threaded which engages an externally threaded mouth portion of said chamber 2, said flange engaging said plate 6 and clamping the same against the annular shoulder 8 in said mouth of said chamber 2. Said plate is held against rotation in said mouth by means of a pin 9 disposed so as to engage the walls of a recess 10 in the periphery of said plate 6. The delivery end of said screw 3 is provided with a central polygonal projection 11 on which a rotating knife 12 is disposed, the latter being adapted to coact with the inner face of said plate 6 and the walls of the perforations in the latter to shear the meat as it passes into said perforations and thus finely divides same. In practice it is customary for the operator to first place in the mouth portion of said chamber 2 a plate 6 having relatively large perforations and after passing the meat through the latter and thus partially finely dividing the same to subsequently remove said plate and replace the same with a similar plate having a large number of very much finer perforations and then again passing the meat through the same and through said last-named plate to further finely divide the same to the desired degree and this obviously requires two operations which are interrupted by the operations of removing and replacing the first plate and which necessitates handling the meat twice.

Frequent handling of the meat is necessarily not conducive to sanitation and the performance of the two operations consecutively also requires time. To overcome these disadvantages I provide an attachment for said machine which is constructed as follows: My said attachment comprises a practically cylindrical chamber 13 provided at one end with an annular internally threaded flange 14 corresponding in size and character of its threads with the ring or nut 7, the said chamber 13 being substantially equal in diameter to the innermost chamber of said nut 7 and being adapted to be mounted upon the threaded discharge end of the chamber 2 to take the place of and perform the function of the nut 7 in holding the plate 6 in place. At its other end said chamber 13 is annularly enlarged to provide a recess for the reception of a finely perforated plate 15 corresponding in size with said plate 6 and being clamped in said recess and held against rotation by means of the said nut 7 and a pin 16 entering and engaging a recess in the periphery of said plate 15. The screw which is primarily contained in the machine to which my said attachment is applied is removed and in place thereof a screw 3 is substituted, the latter being so formed as to provide a spiral passage 17 which is relatively deeper than that usually formed in the screws at present in use and which affords a wall 18 disposed more nearly transversely to the axis of rotation of said screw and is therefore better adapted to force the meat toward the delivery end of said chamber 2. The extreme projecting polygonal end portion of said projection 11 enters and fits a small central opening in the shaft of a screw conveyer 20 the plate of which is disposed at a greater pitch than and is adapted to feed the meat at relatively greater speed than said screw 3, the object thereof being to cause the meat entering the chamber 13 to pass therethrough and be delivered therefrom at relatively greater speed than the same is fed thereto, thus preventing any hindrance to the passage of the meat through the plate 6. The shaft of said screw or conveyer 20 is reduced and square at its outer end to receive the rotating knife 21 and its extreme end is further reduced and rendered cylindrical as at 23 to enter and find a bearing in the central opening of the plate 15. The rotating knife is then mounted upon the portion 11 of said screw 3, the plate 6 replaced and the chamber 13 then secured in position. The screw or conveyer 20, knife 21 and plate 15 are then mounted in place respectively and the nut 7 removed from the end of the chamber 2 is then disposed upon the end of said chamber 13 whereupon the machine will be ready for use and as is obvious will enable the meat to be very finely divided by completing two operations in one thus not only saving time but obviating the necessity of handling the meat more than once in reducing it to the finely divided state. The said chambers 13 and parts constituting my said attachments are made any size to fit the standard size machine now almost universally used and I am thereby enabled to substantially remodel and improve old meat choppers without any appreciable loss of time and without removing the same from its fixed position.

I claim as my invention:

A meat-chopper comprising a barrel provided adjacent one end with a feed opening, a foraminated plate disposed in the delivery end of said barrel, the latter being tapered and of greater diameter at its delivery than at its inlet end, said delivery end being annularly enlarged and externally threaded and provided with an annular recess adapted to receive the peripheral portion of and limit the inward movement of said foraminated plate, a worm revolubly disposed in said barrel and provided at its delivery end with a central projection passing through a central opening in said foraminated plate, the free end of said projection being polygonal, a short cylindrical chamber provided at one end with an internally threaded annular flange adapted to engage the external thread at the delivery end of said barrel, said end of said chamber bearing upon the outer face of said foraminated plate to hold the latter in place, the delivery end of said chamber being externally threaded and provided with an internal annular recess, a second foraminated plate disposed in said recess, a worm having a polygonal recess in one end to receive said polygonal projection of said first-named worm revolubly disposed in said chamber and having greater pitch than said first named worm, a nut disposed on the delivery end of said chamber, an annular flange adapted to bear upon the last-named foraminated plate, said nut being interchangeable with said chamber on said barrel, means holding said plates against rotation, and rotating knives rigid with said worms coacting with said plates to finely divide the meat.

In testimony whereof I have signed my name in presence of two subscribing witnesses.

GEORGE L. FORREST.

Witnesses:
RUDOLPH WM. LOTZ,
ARTHUR A. LOTZ.